US007904442B2

(12) United States Patent
Bahn

(10) Patent No.: US 7,904,442 B2
(45) Date of Patent: Mar. 8, 2011

(54) METHOD AND APPARATUS FOR FACILITATING A COLLABORATIVE SEARCH PROCEDURE

(75) Inventor: Eric D. Bahn, Belmont, CA (US)

(73) Assignee: Intuit Inc., Mountain View, CA (US)

( * ) Notice: Subject to any disclaimer, the term of this patent is extended or adjusted under 35 U.S.C. 154(b) by 336 days.

(21) Appl. No.: 11/931,460

(22) Filed: Oct. 31, 2007

(65) Prior Publication Data
US 2009/0112807 A1  Apr. 30, 2009

(51) Int. Cl.
*G06F 17/30* (2006.01)
(52) U.S. Cl. .......................................... 707/708; 707/732
(58) Field of Classification Search .......................... None
See application file for complete search history.

(56) References Cited

U.S. PATENT DOCUMENTS

| | | | | |
|---|---|---|---|---|
| 6,092,049 | A * | 7/2000 | Chislenko et al. ............... | 705/10 |
| 7,103,592 | B2 * | 9/2006 | Huret ................................ | 707/3 |
| 7,617,160 | B1 * | 11/2009 | Grove et al. ................... | 705/500 |
| 2002/0078045 | A1 * | 6/2002 | Dutta ................................. | 707/7 |
| 2004/0054572 | A1 * | 3/2004 | Oldale et al. ..................... | 705/10 |
| 2009/0077057 | A1 * | 3/2009 | Ducheneaut et al. ............. | 707/5 |

* cited by examiner

*Primary Examiner* — Don Wong
*Assistant Examiner* — Belinda Xue
(74) *Attorney, Agent, or Firm* — Park, Vaughan, Fleming & Dowler LLP

(57) ABSTRACT

One embodiment of the present invention provides a system that facilitates intelligent query operations by using a collaborative search procedure which employs tribal knowledge from a group of like-minded individuals. During operation, the system receives a search query from the user. The system then processes the query using the tribal knowledge obtained from like-minded individuals to produce a results list for the user. For example, this tribal knowledge can include the browsing habits of the collection of users as represented by their selection of websites and the session times for these website views, as well as any reviews posted by these users for the websites they browse.

15 Claims, 13 Drawing Sheets

METHOD AND APPARATUS FOR FACILITATING A COLLABORATIVE SEARCH PROCEDURE

BACKGROUND

1. Field of the Invention

The present invention relates to techniques for facilitating intelligent query operations. More specifically, the present invention relates to a method and apparatus for customizing search results for a user through a collaborative search procedure that employs "tribal knowledge" obtained from a group of like-minded individuals.

2. Related Art

In order to efficiently search through the vast amount of information that is available on the Internet, computer users typically rely on Internet search engines to identify desired information. When a user submits a query, the search engine returns a list of search results to the user, wherein the search results include links to the websites that best match the terms in the query. To perform an effective search, a user typically performs an iterative search process. With each iteration, the user further-refines the terms in the query to filter out the sites that do not match the user's immediate interests.

While the search results generated by search engines are often useful, they are typically not as trustworthy as recommendations provided by friends, acquaintances, or other peers of the user. Hence, there is presently a disconnect between techniques employed by search engines and the sharing of such "tribal knowledge" between peers.

SUMMARY

One embodiment of the present invention provides a system that facilitates intelligent query operations by using a collaborative search procedure which employs tribal knowledge from a group of like-minded individuals. During operation, the system receives a search query from the user. The system then processes the query using the tribal knowledge obtained from like-minded individuals to produce a results list for the user. For example, this tribal knowledge can include the browsing habits of the collection of users as represented by their selection of websites and the session times for these website views, as well as any reviews posted by these users for the websites they browse.

In a variation on this embodiment, the system provides a registered user with a profile-creation page. In this profile-creation page, the system provides one or more categories for the user to choose from. Each category can be an attribute that defines a characteristic or personal interest of the user. These attributes can include age, gender, ethnicity, industry of employment, religion, political affiliations, sports affiliations, club affiliations, hobbies, health topics of interest, and any other keywords that help describe the user. The system then receives from the user a selection of one or more of the available categories, wherein selecting one or more categories in the profile-creation page allows the user to define personal characteristics to be used during the collaborative search procedure.

In a variation on this embodiment, the collection of like-minded individuals are users which have a profile which resembles the user's profile. This resemblance to the user's profile can be identified by an overlap in category selections, attribute values, or any other resemblance in profile characteristics.

In a variation on this embodiment, in response to receiving a selection of a category, the system provides a user with zero or more sub-categories that can be selected to define detailed personal characteristics.

In a variation on this embodiment, the system receives a parameter value from a user for a corresponding category, and associates the parameter value with the corresponding category.

In a variation on this embodiment, each user is associated with one or more associated personal profiles.

In a variation on this embodiment, the system: provides a registered user with a profile-modification page; receives profile modifications from the registered user through the profile-modification page; and commits these profile modifications to the corresponding personal profile.

In a variation on this embodiment, the system tracks the sites visited by the user from each link provided by a collaborative search results page, and records a session time spent by the user at each of these links. Furthermore, the values attained from recording the session time and tracking sites visited by the user are incorporated into the tribal knowledge.

In a variation on this embodiment, the system sorts the collaborative search results so that links most useful to like-minded individuals appear first. To achieve this, the usefulness of a link to like-minded individuals is defined by the number of visits and total duration for visits of like-minded individuals.

In a variation on this embodiment, the results page comprises at least one of two types of search results: organic search results from existing Internet search engines, and collaborative search listings derived from tribal knowledge of like-minded individuals.

In a variation on this embodiment, the system: receives a review from a user for a website; associates the review with the user; and associates the review with the website.

BRIEF DESCRIPTION OF THE FIGURES

FIG. 11 presents a diagram depicting the initial search screen that is provided to a user immediately after the user logs in.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Back-end Process

Figure 1:
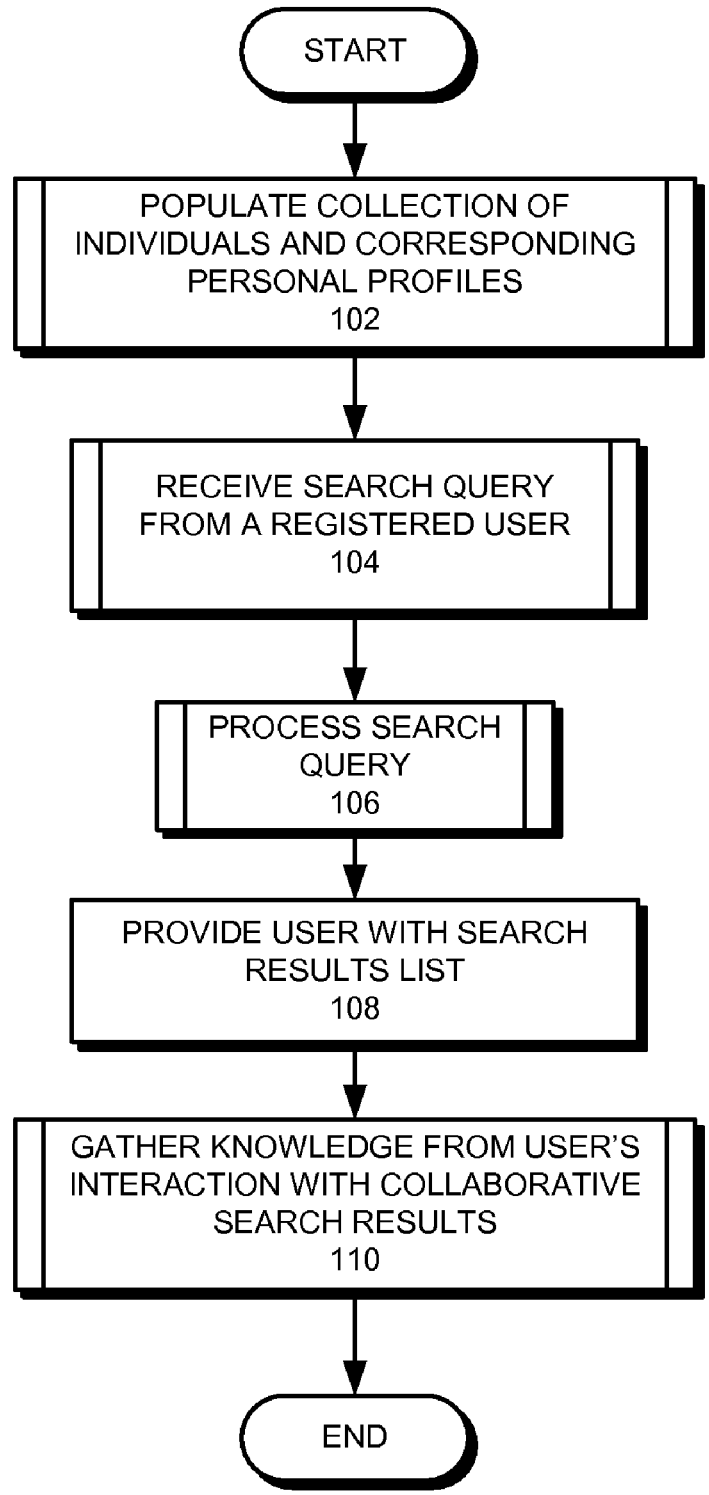
FIG. 1 illustrates a back-end process for a collaborative-search mechanism in accordance with an embodiment of the present invention.

FIG. 1 illustrates a back-end process for a collaborative-search mechanism in accordance with an embodiment of the present invention. The collaborative-search mechanism begins by populating a collection of users in step 102. In doing so, the collaborative-search mechanism creates accounts for these users with corresponding unique personal identifiers, and creates at least one corresponding personal profile for each of these accounts. Then, the collaborative-search mechanism accepts a user's login and a query request from the user (step 104).

Figure 5:
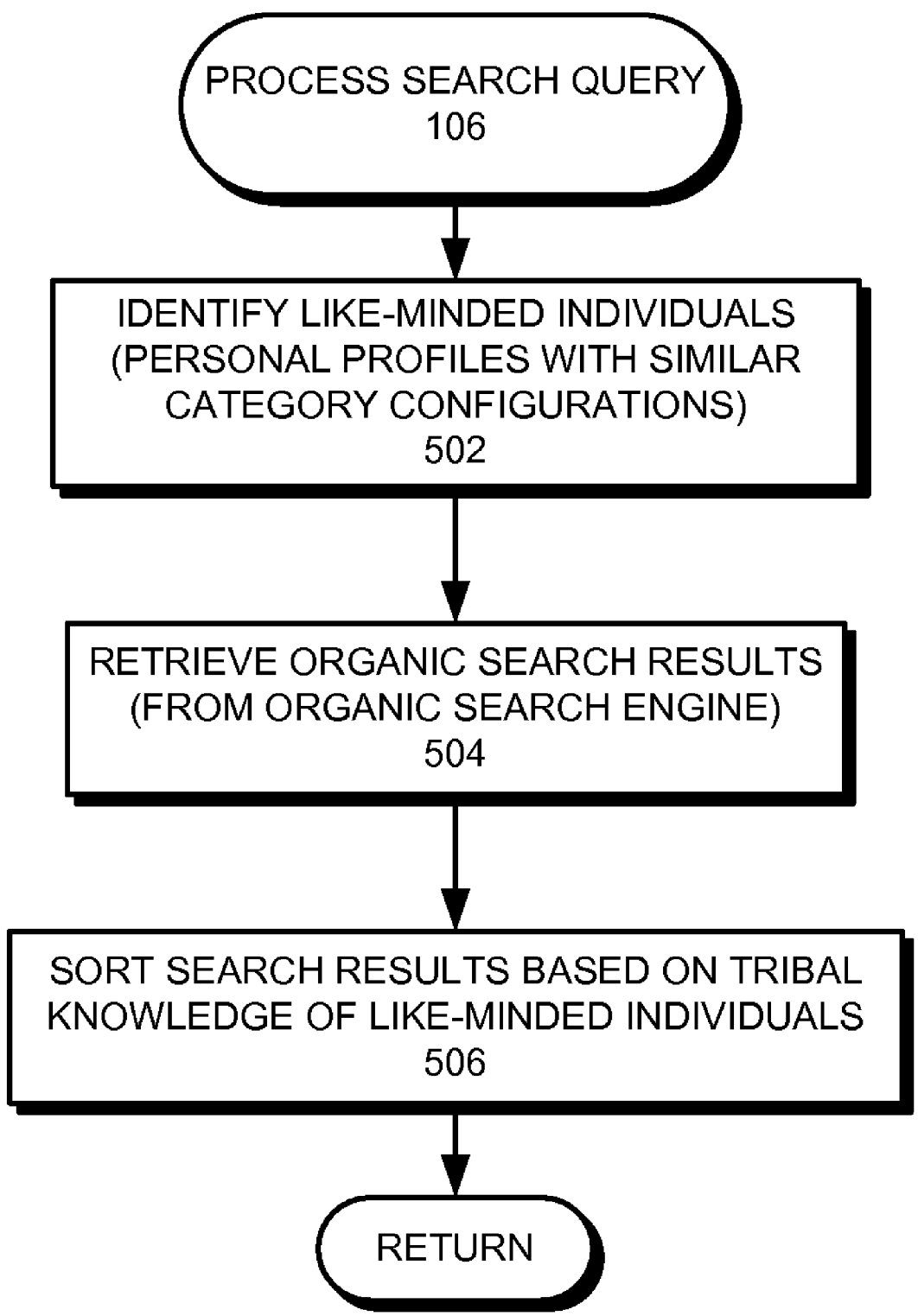
FIG. 5 presents a flowchart illustrating how a collaborative-search mechanism processes a query in accordance with an embodiment of the present invention.

Next, the collaborative-search mechanism processes the user's query as illustrated in FIG. 5 (step 106). This involves obtaining the search results from an existing organic search engine, and presenting the search results to the user in a sorted list, where the earlier links in the list are known to have higher view counts and view durations from like-minded individuals.

After the query is processed and the search result list is sorted, the system provides the user with a search results page (step 108). In one embodiment of the present invention, the search results page provides the results in a two-pane window. In the left window pane, the results page provides the raw search results that are obtained from the existing organic search engines. In the right window pane, the search results page provides the same results sorted by known relevance to like-minded individuals. In an alternate embodiment, the search results page only provides the sorted search results. In yet another embodiment, when no like-minded individuals are identified for the user, the results page can revert to providing the raw results that are obtained from the underlying organic search engine.

Once the system provides the user with the search results, the user is allowed to click on the links in the search results to browse through the corresponding web sites. The system then gathers knowledge from the interaction of each user with the collaborative search results (step 110). During this process, the system monitors the click-through actions of the user and inserts the clicked-on link into the visited site list of the user's active profile. The system also monitors the session time for each viewed search result page, and stores the session time in the user's active profile by associating the session time to the corresponding visited site entry. The user contributes to the tribal knowledge of the collaborative-search mechanism by opening the web sites that appear to be relevant to the user's interests, and in doing so briefly glancing over less-interesting web sites while thoroughly browsing through the more-relevant web sites. The user can also contribute to the tribal knowledge of the collaborative-search mechanism by posting reviews on the websites the user finds interesting.

In one embodiment of the present invention, for each of the links, the collaborative search result list shows additional information from the tribal knowledge of like-minded individuals. In a variation of this embodiment, where the query corresponds to a sale item and a set of the collaborative search listings corresponds to possible storefronts for the sale item, the additional information provided for each of the links can show the number of like-minded individuals that purchased the item at each of the storefronts. In another variation of this embodiment, the additional information provided for each of the links can show comments from like-minded individuals about the link destinations.

Front-end Process

Figure 2:
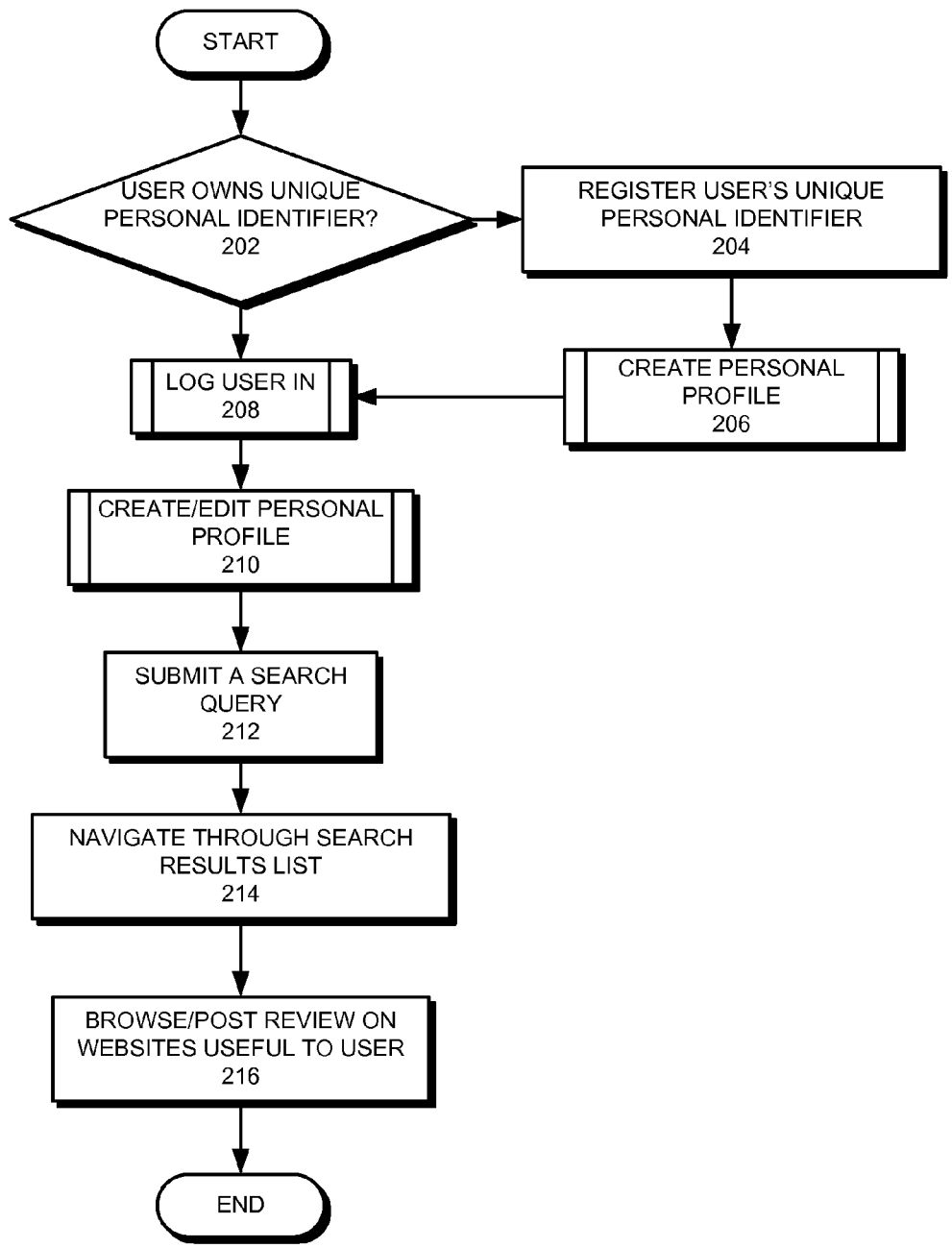
FIG. 2 illustrates a front-end process for a collaborative-search mechanism in accordance with an embodiment of the present invention.

FIG. 2 illustrates a front-end process for a collaborative-search mechanism in accordance with an embodiment of the present invention. This front-end process concerns itself with the events that are observable to the user as the user accesses the collaborative-search mechanism.

If the user does not have a unique personal identifier, which is required to log onto and use the collaborative-search mechanism (step 202), the user is redirected to register a unique personal identifier (step 204) and create a corresponding personal profile (step 206). On the other hand, a user with an existing unique personal identifier is allowed to log onto the collaborative-search mechanism if the user has not done so already (step 208). Once logged in, the user has the option of creating a new personal profile, or editing an existing personal profile (step 210).

Figure 11:
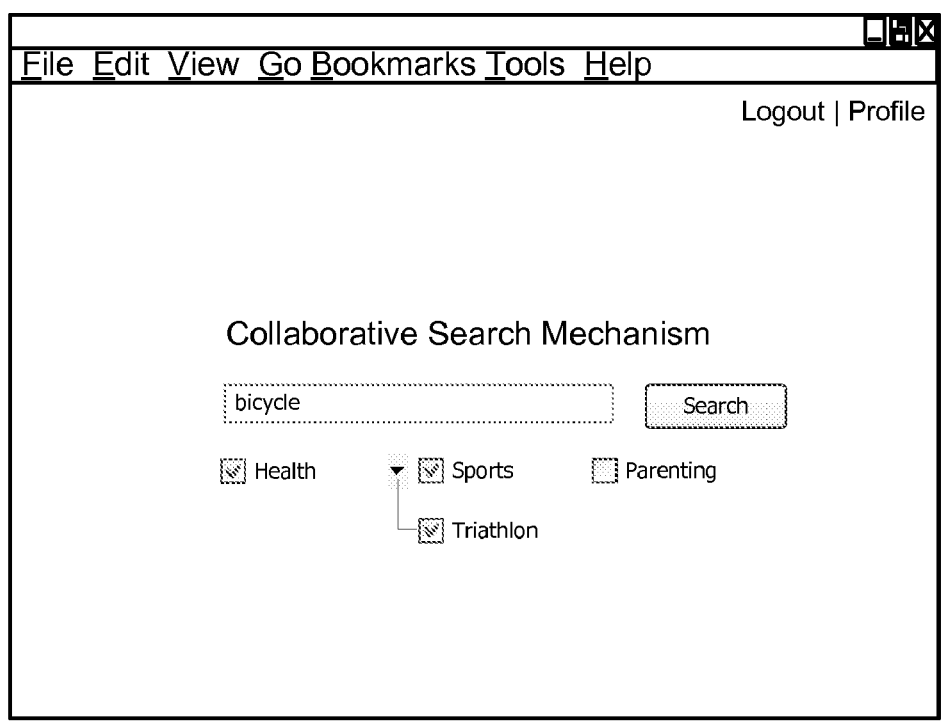
Figure 12:
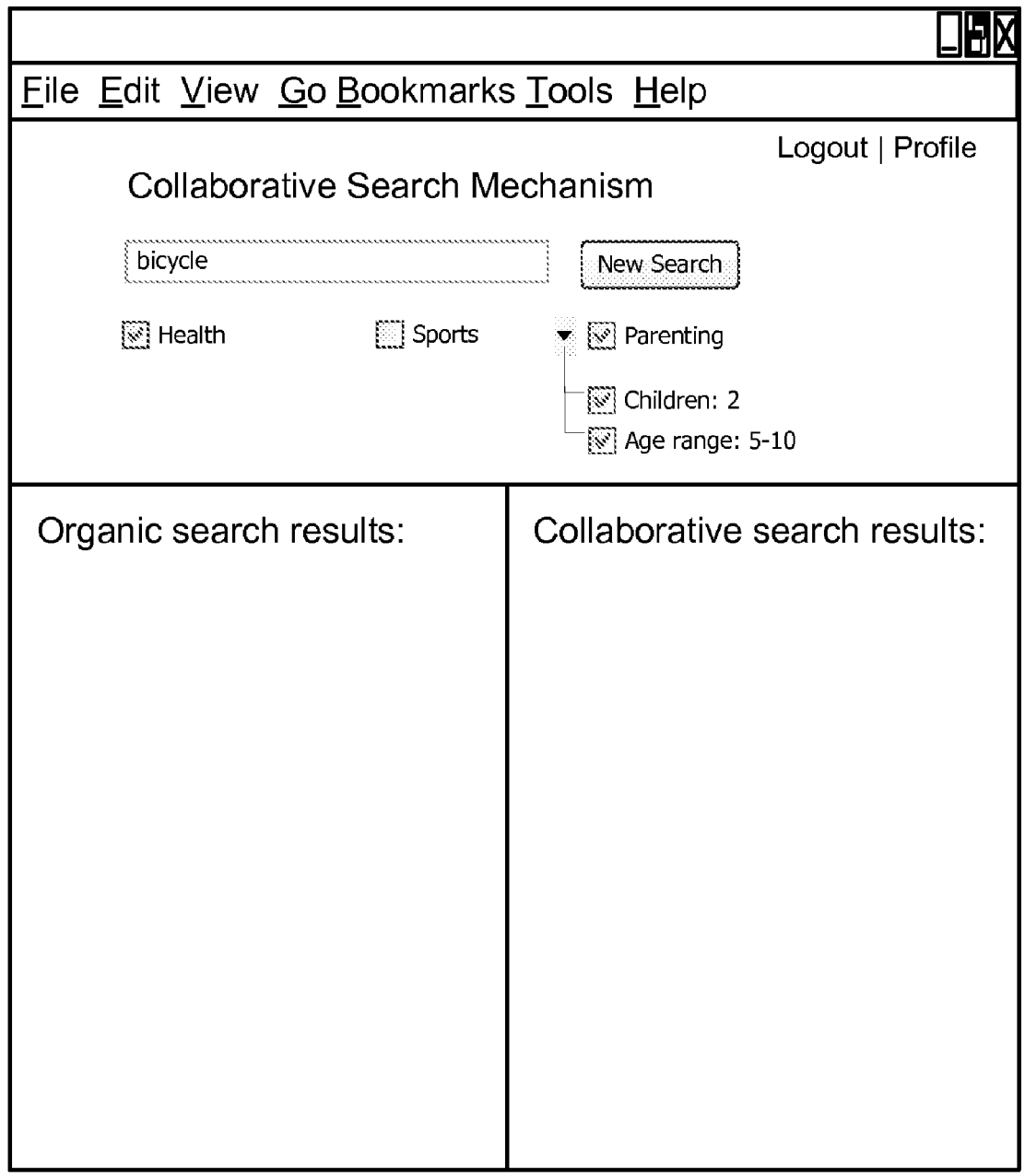
FIG. 12 presents a diagram depicting the results page that provides the organic search results and the collaborative search results, along with the search screen.

The user is also allowed to temporarily alter the categories of the user's primary profile by selecting or deselecting profile categories that are listed below the search field (FIG. 11, FIG. 12). Each category can be an attribute that defines a characteristic or personal interest of the user. These attributes can include: age, gender, ethnicity, industry of employment, religion, political affiliations, sports affiliations, club affiliations, hobbies, health topics of interest, and any other keywords that help describe the user. This ability to temporarily alter the categories prior to submitting a query allows the user to fine-tune the context for each independent query for optimal results. Next, the user submits the query that is accompanied by the personal profile characteristics in step 212.

After submitting the query, the user is presented with a search results page, which enables the user to navigate through the search results list (FIG. 12). The user navigates through the search results list by opening the web sites that appear to be relevant to the user's interests (step 214). The result of this process is that the user creates knowledge for the collaborative-search mechanism while navigating through the search result links. The user also browses through the resulting web sites and can post reviews for these websites (step 216). During this process, the user creates knowledge for the collaborative-search mechanism by briefly glancing over less-interesting web sites while more thoroughly browsing through the more-relevant web sites, and by posting reviews for the websites the user finds interesting.

Populating Collection of Individuals

Figure 3:
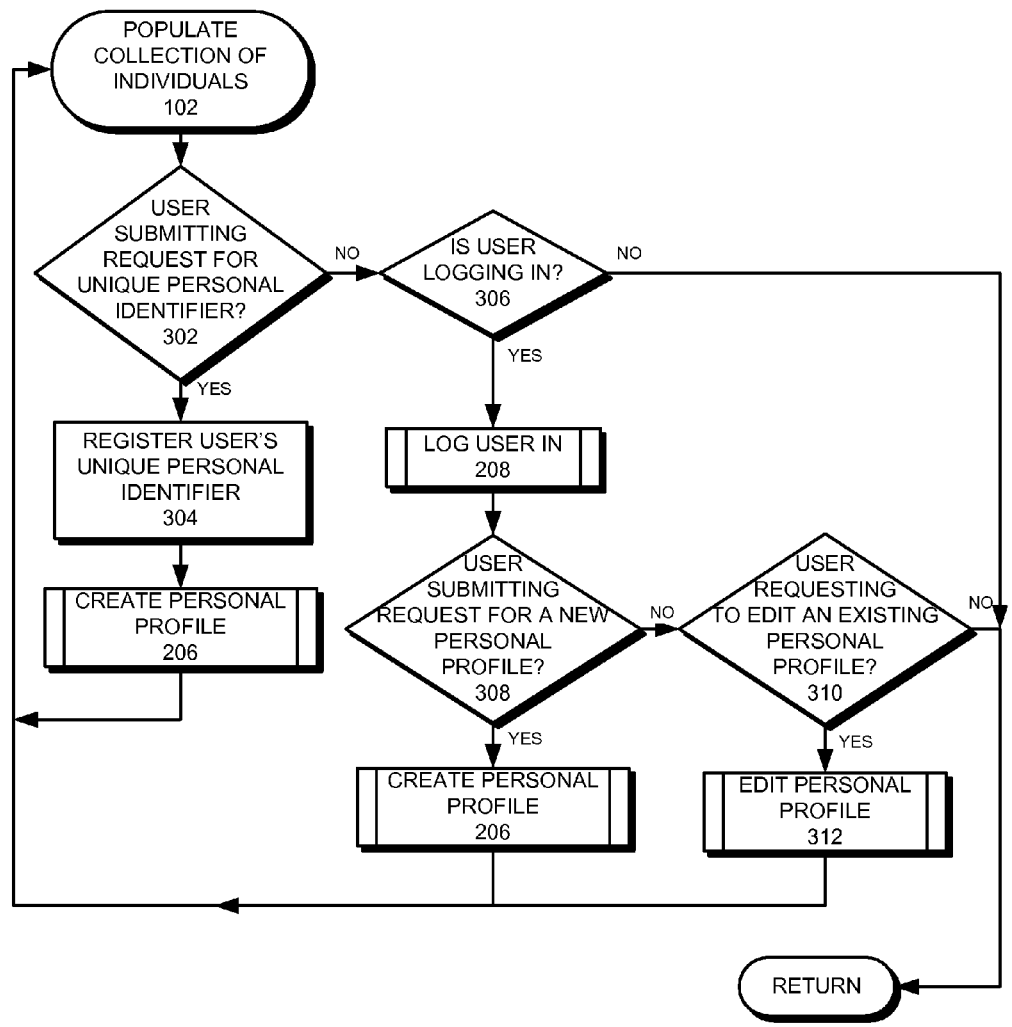
FIG. 3 presents a flowchart illustrating how a collaborative-search mechanism populates a collection of individuals in accordance with an embodiment of the present invention.

FIG. 3 presents a flowchart illustrating how the collaborative-search mechanism populates a collection of individuals in step 102. This procedure allows a user to request a new unique personal identifier, create a new personal profile for an existing unique personal identifier, and allows the user to modify an existing personal profile.

If the user submits a request for a new unique personal identifier in step 302, the collaborative-search mechanism registers the user's unique personal identifier (step 304). Otherwise if user wishes to submit a request for a new personal profile (step 308) or edit an existing personal profile (step 310), the user should first log in under a unique personal identifier (step 306).

Figure 7:
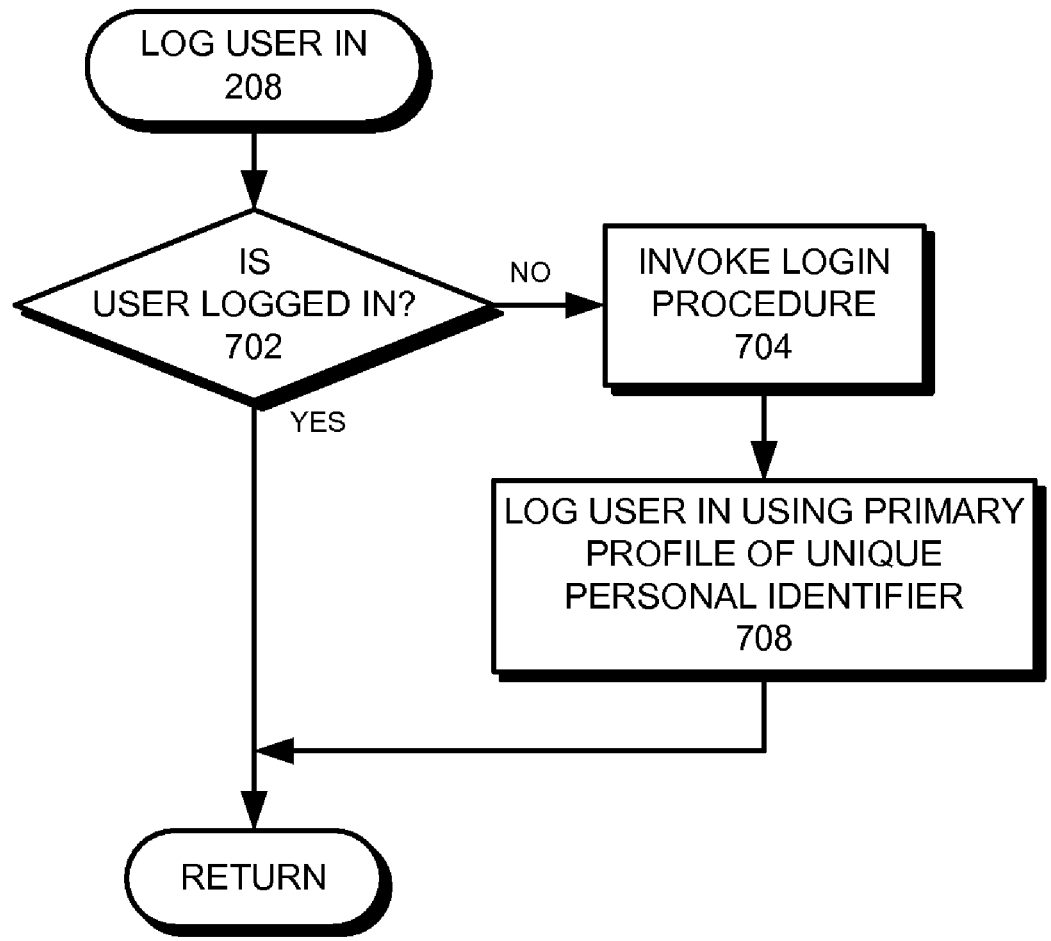
FIG. 7 presents a flowchart illustrating how a user is logged into a collaborative-search mechanism in accordance with an embodiment of the present invention.

A user can log into the collaborative-search mechanism through the predefined process illustrated in FIG. 7 (step 208). If the user wishes to create a new personal profile for an existing unique personal identifier at step 308, the collaborative-search mechanism provides the user with the mechanism for creating a new personal profile (step 206). Otherwise, if the user wishes to edit an existing personal profile (step 310), the collaborative-search mechanism provides the user with the mechanisms to edit an existing personal profile (step 312).

Initiating a Search Query

Figure 4:
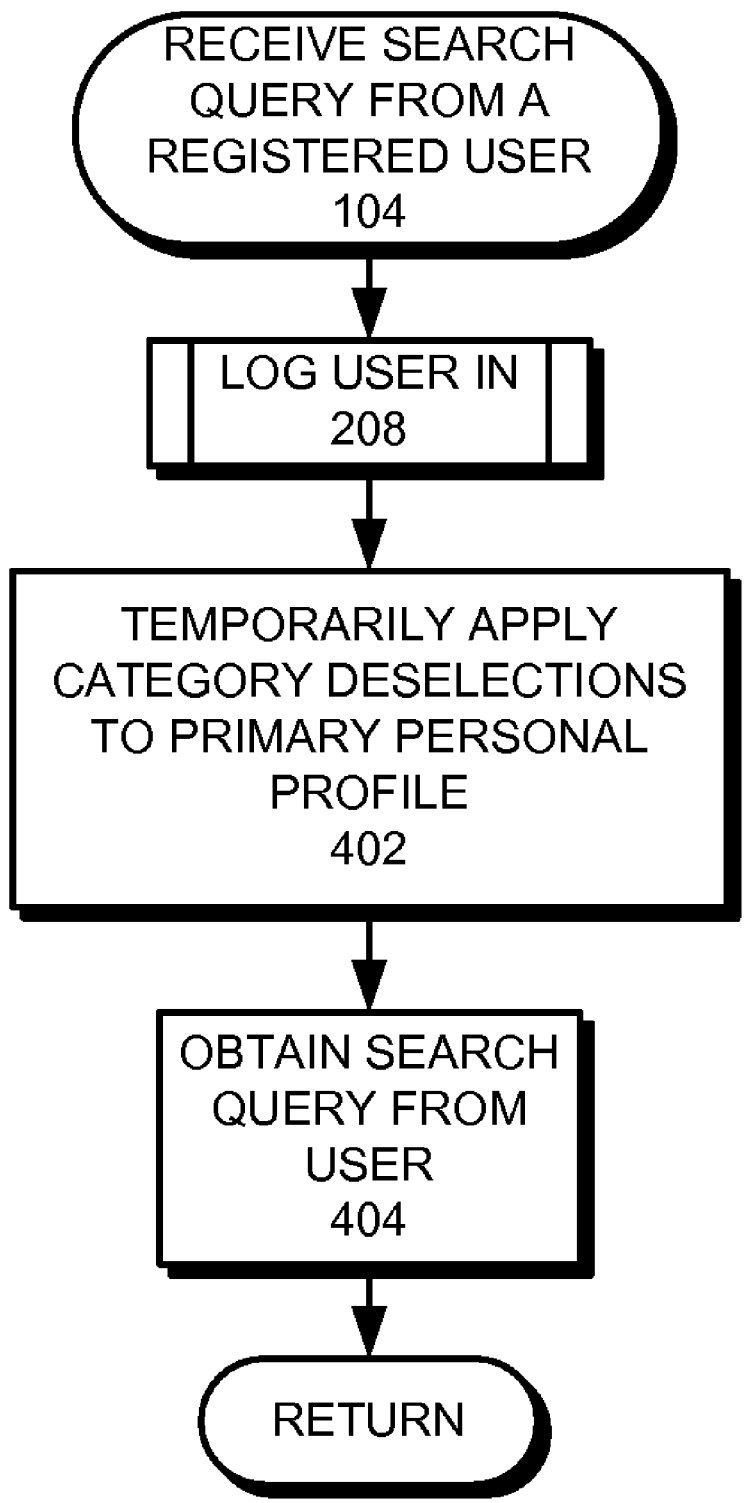
FIG. 4 presents a flowchart illustrating how a collaborative-search mechanism receives a query from a user in accordance with an embodiment of the present invention.

FIG. 4 presents a flowchart illustrating how the collaborative-search mechanism receives a query from a user in accordance with an embodiment of the present invention (step 104). The system first ensures that a user is logged in under a unique personal identifier (step 208). Then, the system observes any changes to the category selections under the search field, and temporarily applies these modifications to the primary personal profile (step 402). Finally, the procedure obtains the query from the search field (step 404).

Consider the example of a user buying a bicycle. In this example, the user may wish to search the Internet to identify the best bicycle that satisfies the user's needs, as well as to identify a storefront (i.e., an Internet-based or physical storefront) that can give the user the best service and price. In order to make a best use of the collaborative search capability, the user provides the search mechanism with information that informs the search mechanism about the unique characteristics that define the user.

In the example of a search for a "bicycle," a first user may have "parent" listed as one of the categories with additional information specifying that the user is a parent of two children, whose age range is between five and ten years old. A second user, on the other hand, may have "triathlon" listed as one of the categories. Under the configuration for the first user, the search results may identify a listing of safe and affordable bicycle brands for children as well as local toy stores and discount stores that carry them. However, under the configuration of the second user, the search results provide a listing for high-performance road bicycles as well as local bicycle shops that provide parts and services for these high-performance bicycles.

During step 402, the user is able to select and de-select the categories that are defined in the user's profile to further customize each individual query. For the example above, a third user may be both a parent and a triathlete, and thus may have a profile that encompasses the definitions of the first and the second users. Under this profile, the third user is a parent of two children within the ages of five and ten, as well as a participant in triathlons. Therefore when searching for a replacement bicycle for an upcoming triathlon, the third user may wish to de-select the "parent" category of the third user's primary profile to attain the collaborative search results of the second user (FIG. 11). On the other hand, when the user enters a query for "bicycle" while looking for a birthday gift for one of the user's children, the user may wish to de-select the "triathlon" category of the user's primary profile to obtain the collaborative search results of the first user (FIG. 12).

Collaborative Search Process

FIG. 5 presents a flowchart illustrating how a collaborative-search mechanism processes a query in accordance with an embodiment of the present invention. The system first uses the user's personal profile that is specific to the immediate query to identify the like-minded individuals that have a personal profile with similar category configurations to the user (step 502). This is achieved by comparing the selected categories in the user's immediate personal profile to the category selections of other profiles in the universe of individuals.

Independently, and possibly in parallel, the procedure to process a query of FIG. 5 retrieves search results from an existing organic search engine (step 504). Finally, in step 506, the collaborative-search mechanism sorts the search results from step 504, based on the browsing habits of the like-minded individuals from step 502. In this step, the collaborative-search mechanism sorts the search results by accumulating, for each search result, the total number of visits and the total session time by all like-minded individuals for a specific search query.

In one embodiment of the present invention, the collaborative search page provides the user with a list of search engines that can be used to search the web. In this configuration, the user has the ability to choose the underlying search engine that is used by step 504 to provide the search information. In one variation of this embodiment, the user is able to select multiple search engines from the list of available search engines, in which case the collaborative-search mechanism processes the query by utilizing the set of chosen search engines simultaneously.

Data Mining for Tribal Knowledge

Figure 6:
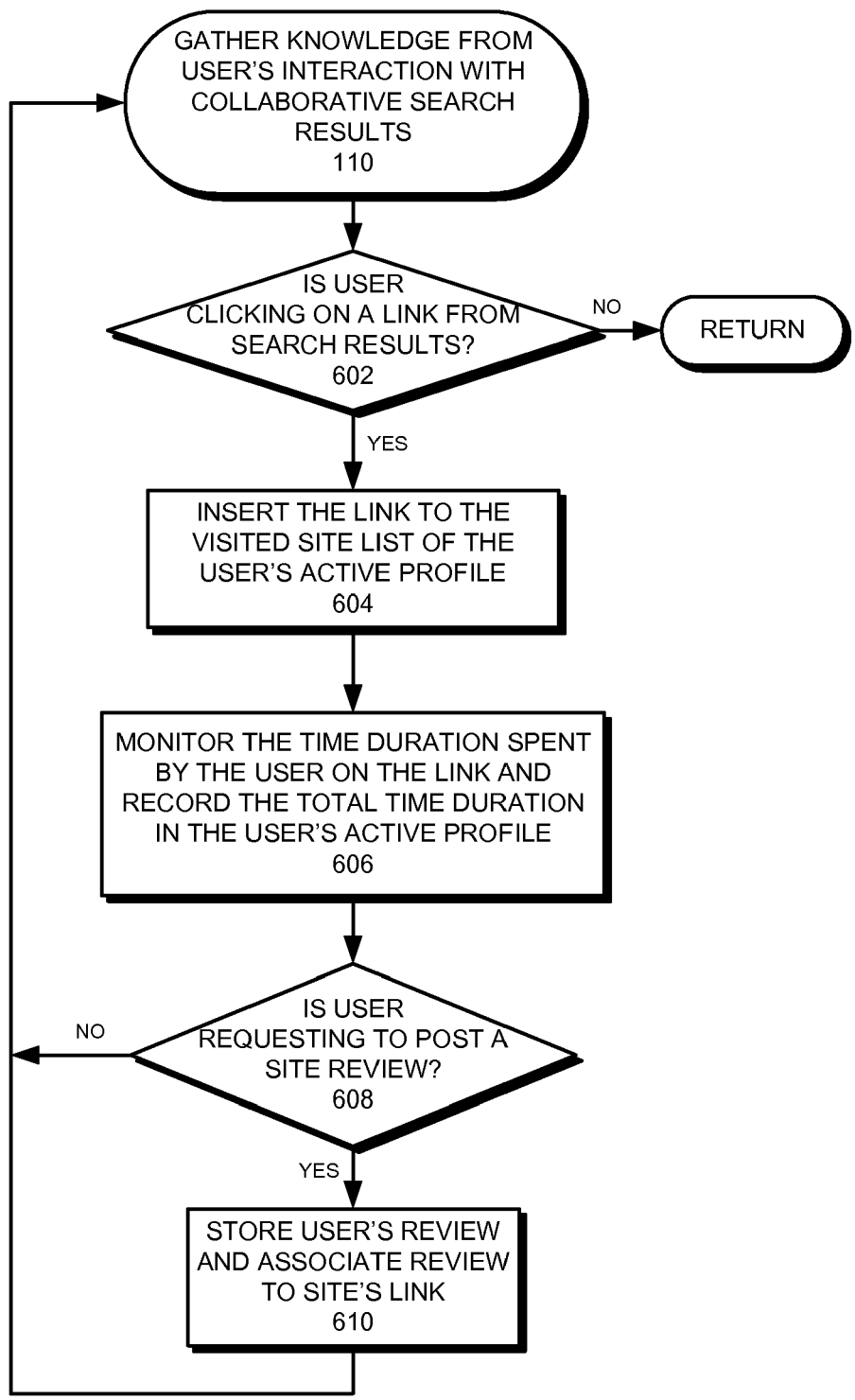
FIG. 6 presents a flowchart illustrating how a collaborative-search mechanism gathers knowledge from a user's interaction with the search results in accordance with an embodiment of the present invention.

FIG. 6 presents a flowchart illustrating how a collaborative-search mechanism gathers knowledge from a user's interaction with the search results in accordance with an embodiment of the present invention. This process continues to loop for as long as a user is browsing through the search results. If the user clicks on a link from the search results (step 602), the collaborative-search mechanism inserts the link into the visited site list of the user's primary profile (step 604). Furthermore, the collaborative-search mechanism monitors the session time spent by the user to browse a site, records the session time in the user's primary profile, and associates the session time to the corresponding link in the visited site list (step 606). As a result of this process, the collaborative-search mechanism can save the browsing decisions for later searches from the user and other like-minded users.

While browsing through a website, the user can post a review for the website (step 608). If so, the collaborative-search mechanism stores the user's review and associates the user's review with the corresponding link in the visited site list (step 610).

In one embodiment of the present invention, the click-through and session-time tracking system of the collaborative-search mechanism are features of an Internet website.

In one embodiment of the present invention, the click-through and session-time tracking systems of the collaborative-search mechanism are part of a browser that is part of an accounting software system.

In one embodiment of the present invention, the click-through and session-time tracking systems of the collaborative-search mechanism exist as part of an Internet browser plug-in.

In one embodiment of the present invention, the click-through and session-time tracking systems of the collaborative-search mechanism exist on a network proxy server.

User Login

FIG. 7 presents a flowchart illustrating how a user logs into a collaborative-search mechanism in accordance with an embodiment of the present invention. If a user is not logged in (step 702), the collaborative-search mechanism invokes a login procedure (step 704). Then, the collaborative-search mechanism logs the user into the system using the category selections from the user's primary personal profile (step 706).

Creating or Editing a Personal Profile

Figure 8:
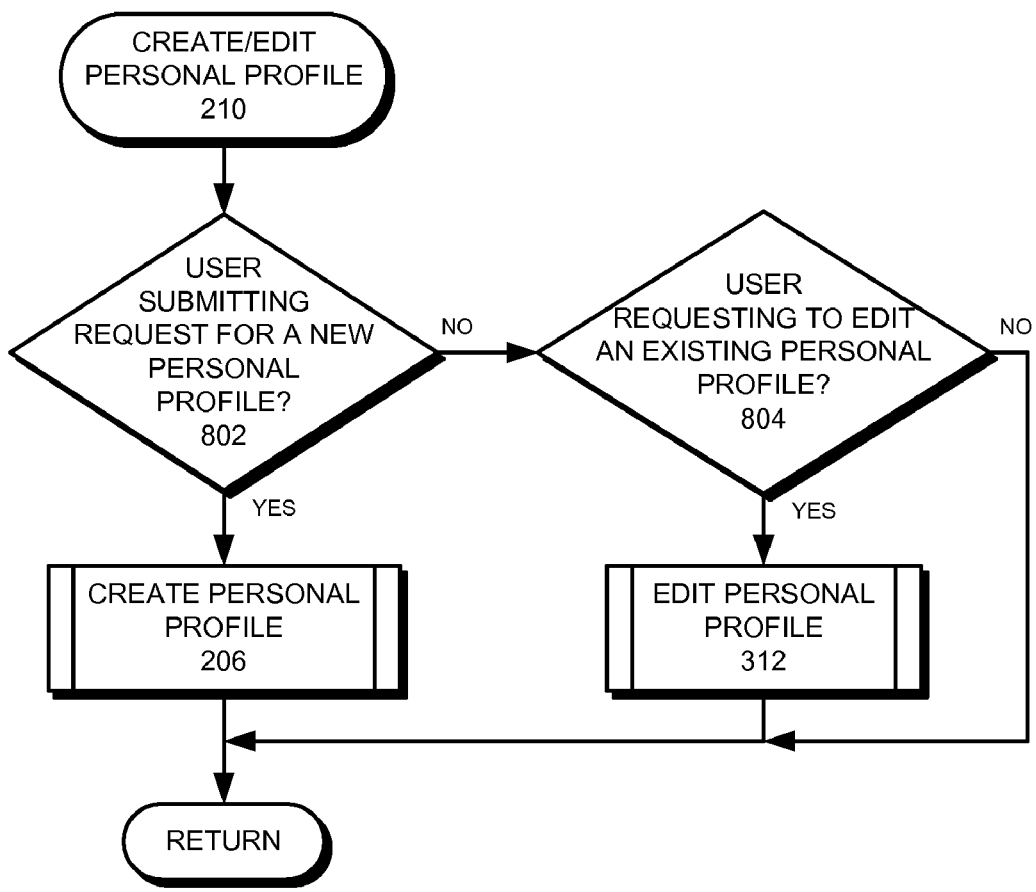
FIG. 8 presents a flowchart illustrating how a user can create or edit a personal profile in accordance with an embodiment of the present invention.

FIG. 8 presents a flowchart illustrating how a user can create or edit a personal profile in accordance with an embodiment of the present invention. As a prerequisite to this procedure, the user should be logged in to the system to have access to the personal profiles associated with the user. If the user is submitting a request for a new personal profile (step 802), the system provides the user with the mechanism to create a new personal profile (step 206). Otherwise, if the user is requesting to edit an existing personal profile (step 804), the system provides the user with a mechanism to edit an existing personal profile that corresponds to the user's unique personal identifier (step 312).

Figure 9:
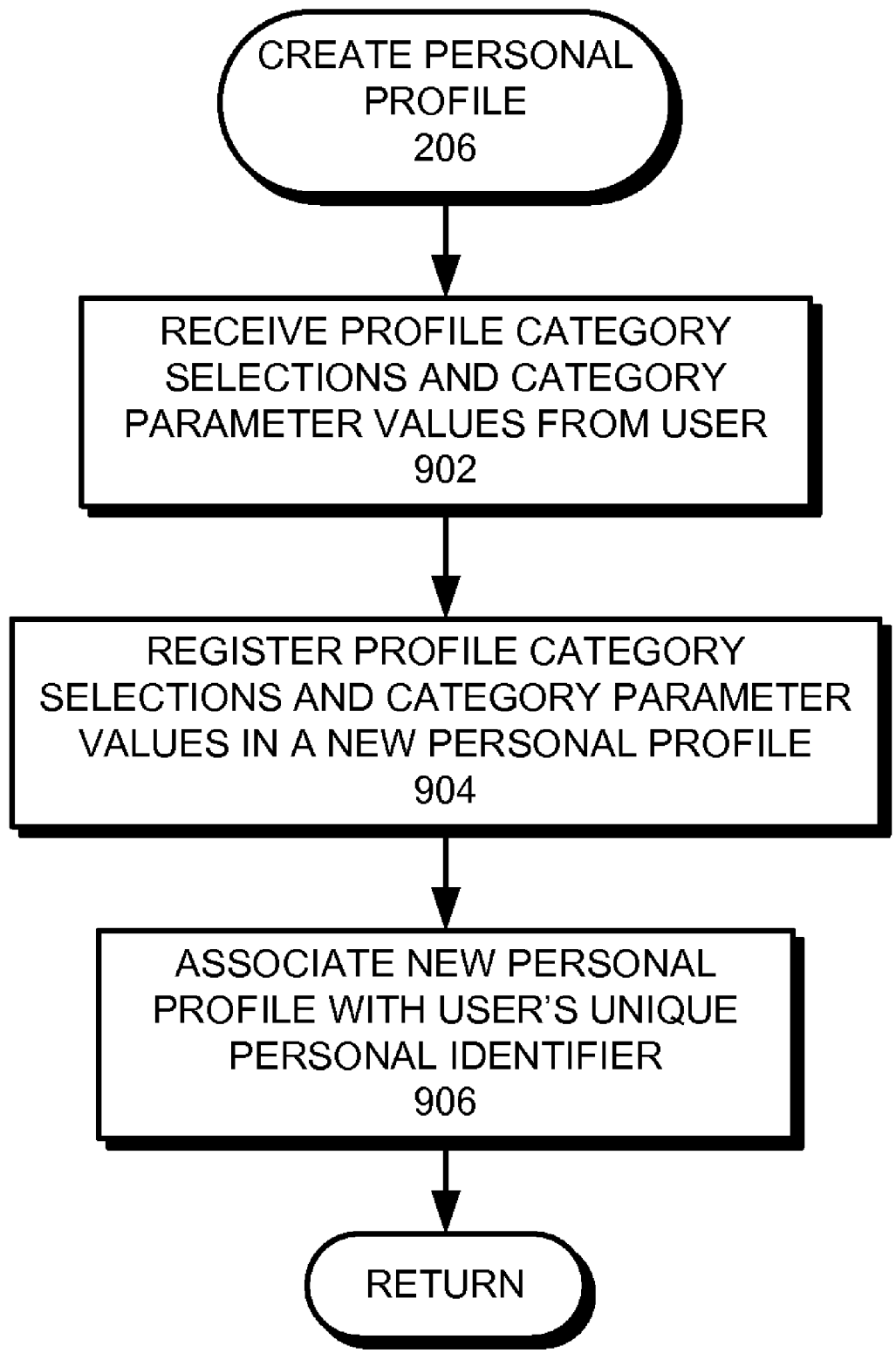
FIG. 9 presents a flowchart illustrating how a user can create a personal profile in accordance with an embodiment of the present invention.

FIG. 9 presents a flowchart illustrating how a user can create a personal profile in accordance with an embodiment of the present invention (step 206). The system begins by receiving category selections and category parameter values from the user (step 902). Then, the system registers the information from step 902 in a new personal profile (step 904). Finally, the system associates the new personal profile with the user's unique personal identifier (step 906). This process can be repeated every time a user desires to create a new personal profile after having already logged in using a unique personal identifier.

Figure 10:
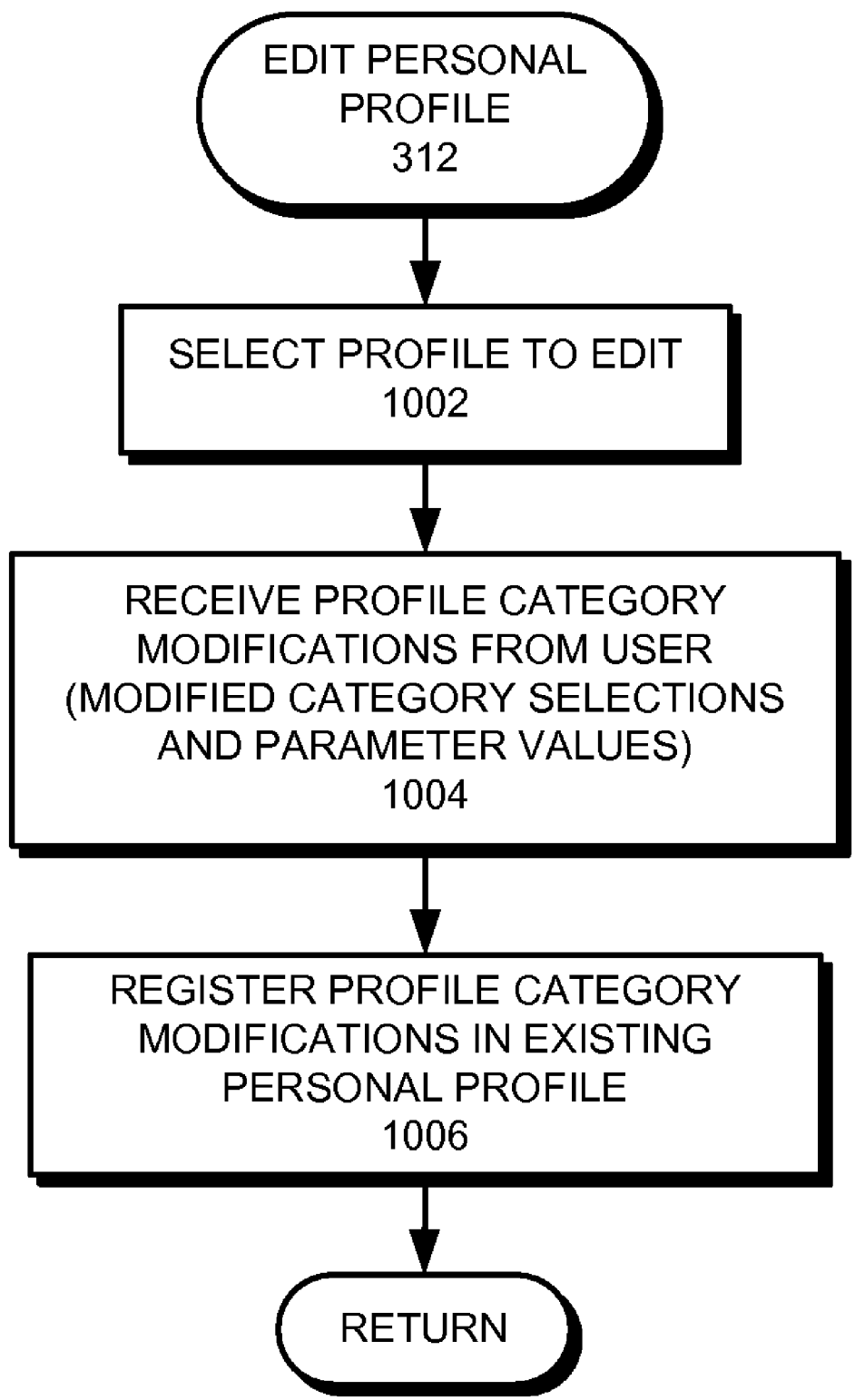
FIG. 10 presents a flowchart illustrating how a user can edit a personal profile in accordance with an embodiment of the present invention.

FIG. 10 presents a flowchart illustrating how a user can edit a personal profile in accordance with an embodiment of the present invention (step 312). The system begins by receiving from the user, a personal-profile selection from the set of profiles of the user's unique personal identifier (step 1002). Then, the system receives the category modifications from the user, which includes modified category selections and modified category parameter values (step 1004). Finally, the system registers the category modifications into the selected personal profile (step 1006).

In one embodiment of the present invention, the profile-creation/modification mechanism 210 can be implemented as an automated mechanism that allows the user to import personal profiles from social network websites. In one variation of this embodiment, importing personal information from an existing profile on a social network website may also involve extracting extended information from the profiles of the immediate social connections of the user.

In one embodiment of the present invention, upon selecting a category provided in step 902 to create a new profile, if the category has sub-categories, the system provides the user with the sub-categories to select from before commencing step 904. Similarly, upon selecting a category provided in step 1002 while editing an existing profile, if the category has sub-categories, the system provides the user with the sub-categories to select from before commencing step 1004.

In one embodiment of the present invention, a user is able to create a category for the user's profile when a related category does not exist.

Computing Environment

Figure 13:
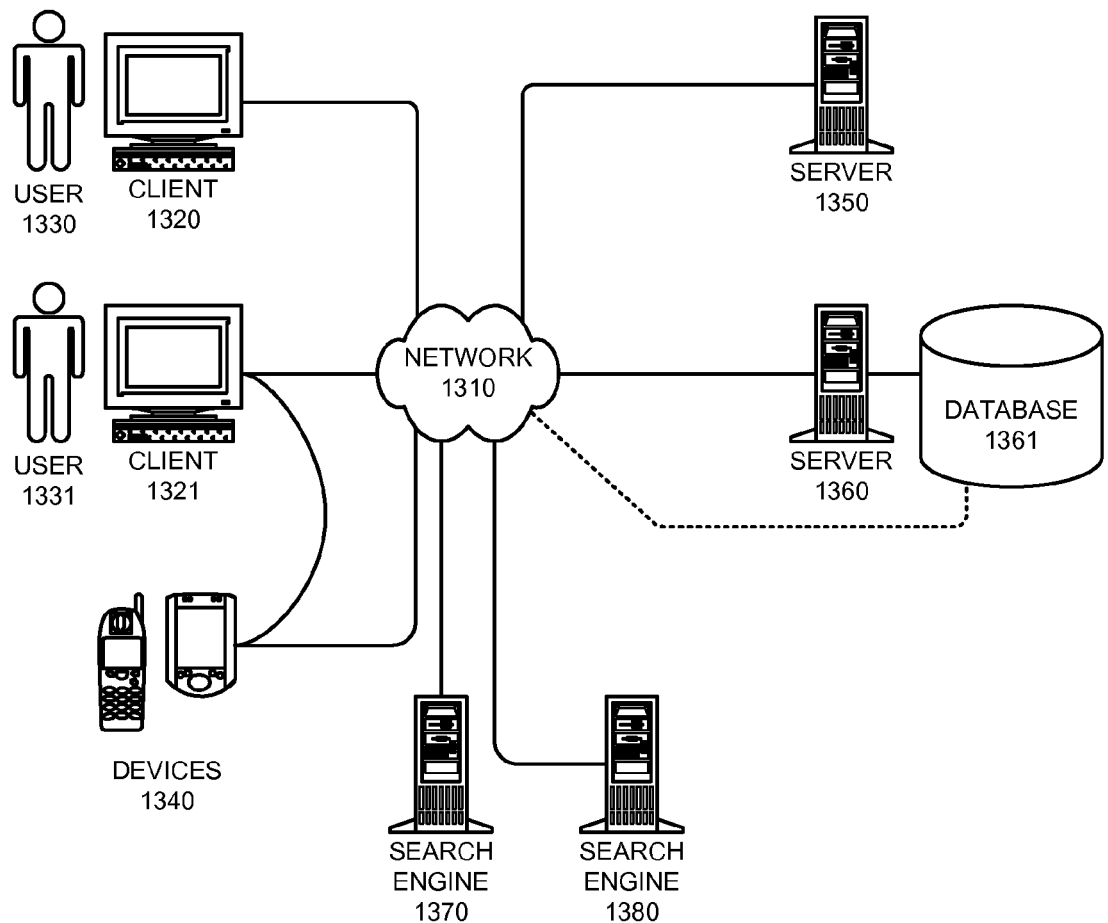
FIG. 13 illustrates a computing environment in accordance with an embodiment of the present invention.

FIG. 13 illustrates a computing environment 1300 in accordance with an embodiment of the present invention. Computing environment 1300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 13, computing environment 1300 includes network 1310, clients 1320-1321, users 1330-1331, devices 1340, servers 1350-1360, database 1361, and search engines 1370-1380.

Network 1310 can include any type of wired or wireless communication channel capable of coupling together computing nodes. This includes, but is not limited to, a local area network, a wide area network, or a combination of networks. In one embodiment of the present invention, network 1310 includes the Internet. In some embodiments of the present invention, network 1310 includes phone and cellular phone networks.

Clients 1320-1321 can include any node on a network including computational capability and including a mechanism for communicating across the network.

Similarly, servers 1350-1360 can generally include any node on a network including a mechanism for servicing requests from a client for computational and/or data storage resources.

Users 1330 and 1331 can include: an individual; a group of individuals; an organization; a group of organizations; a computing system; a group of computing systems; or any other entity that can interact with computing environment 100.

Devices 1340 can include any type of electronic device that can be coupled to a client, such as client 1321, or a network, such as network 1310, to perform query operations. This includes, but is not limited to, cell phones, Personal Digital Assistants (PDAs), smart-phones, or any other device that can be used to perform a query operation.

Database 1361 can include any type of system for storing data in non-volatile storage. This includes, but is not limited to, systems based upon magnetic, optical, or magneto-optical storage devices, as well as storage devices based on flash memory and/or battery-backed up memory. Note that database 1361 can be coupled: to a server (such as server 1360), to a client, or directly to a network.

Search engines 1370-1380 can generally include any server that processes a query to provide a list of references that may satisfy the query.

Note that different embodiments of the present invention may use different configurations, and are not limited to the configuration illustrated in computing environment 1300. In some embodiments of the present invention, the system is implemented as a web-service on server 1350, while in other embodiments of the present invention, the system is implemented as an application executing on client 1320. Also note the users 1330-1331 may access the system via various devices, such as via: clients 1320-1321, devices 1340, or servers 1350-1360.

Alternate Embodiments

In one embodiment of the present invention, the collaborative-search mechanism can be adapted for niche markets (i.e., health industry). Under this embodiment, the categories and sub-categories are detailed and specialized for the identified market. This embodiment is important for user groups with strong niche expertise, where the tribal knowledge is advanced and the information from like-minded people (with similar profiles) is of high-value and should be captured. An example of this embodiment is the application of the collaborative-search mechanism to the healthcare industry, where a user can configure a profile that reflects the user's medical history. Under this example, a first user can create a profile with the skin cancer category selected. This user can submit a query on skin cancer treatment options, and attain detailed and valuable information with respect to skin cancer treatment procedures along with the top-rated treatment centers that provide these procedures. The top collaborative search listings would have been identified and pre-screened by other like-minded people (with similar profiles). However, a second user with a profile characterized around diabetes, and not skin cancer, that performs the same search may instead attain the top search listings definitions that other like-minded users have found comprehensive and informative.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating intelligent query operations using a collaborative search procedure that employs knowledge from like-minded individuals, the method comprising:
generating a knowledge database based on a set of individuals, wherein the knowledge is based on one or more browsing sessions of the set of individuals;
receiving a login request from a user, wherein the user is identified by a unique personal identifier;
generating a profile of the user comprising category configurations for the user, wherein the category configurations are entered by the user, and wherein the unique personal identifier identifying the user is associated with the profile of the user;
receiving a query from the user;
identifying like-minded individuals from the set of individuals based on the profile of the user, wherein the like-minded individuals are individuals with profile category configurations that are similar to the profile of the user;
processing the query with a tribal knowledge of the like-minded individuals to produce a collaborative search results list of links for the query, wherein the tribal knowledge comprises knowledge from the knowledge database for the like-minded individuals;
recording a session time spent by the user at each of the links provided in the collaborative search results list;
tracking sites visited by the user from each of the links provided in the collaborative search results list;
incorporating the values attained from recording the session time and tracking the sites visited into the knowledge database for the like-minded individuals; and
presenting search results to the user in a two-pane window, which include search results from one or more existing organic search engines in one pane of the two-pane window, the collaborative search results list in the other pane of the two-pane window, and a set of categories associated with the profile of the user, wherein selecting or de-selecting a category alters the categories used to process a search query.

2. The method of claim 1, further comprising:
providing the user with a profile-creation page for creating a personal profile for the user;
providing one or more categories which define personal characteristics of the user in the profile-creation page; and
receiving from the user a selection of one or more of the categories, wherein the selection allows the user to define personal characteristics of the user for the collaborative search procedure.

3. The method of claim 2, wherein selecting a category provides the user with zero or more sub-categories that can be selected to define detailed personal characteristics.

4. The method of claim 3, further comprising:
receiving a parameter value from the user for a corresponding category; and
associating the parameter value with the corresponding category.

5. The method of claim 4, further comprising:
providing the user with a profile-modification page;
receiving profile modifications from the user through the profile-modification page; and
committing the profile modifications to the corresponding personal profile of the user.

6. The method of claim 1, further comprising:
sorting the collaborative search results list such that links most useful to like-minded individuals appear first;
wherein the usefulness of a link to the like-minded individuals is defined by the number of visits and total duration time the link has attained from the like-minded individuals.

7. The method of claim 1, further comprising:
receiving a review from the user for a website;
associating the review with the user; and
associating the review with the website.

8. A computer-readable storage medium storing instructions that when executed by a computer cause the computer to perform a method for facilitating intelligent query operations using a collaborative search procedure that employs knowledge from a group of like-minded individuals, the method comprising:
generating a knowledge database based on a set of individuals, wherein the knowledge is based on one or more browsing sessions of the set of individuals;
receiving a login request from a user, wherein the user is identified by a unique personal identifier;
generating a profile of the user comprising category configurations for the user, wherein the category configurations are entered by the user, and wherein the unique personal identifier identifying the user is associated with the profile of the user;
receiving a query from the user;
identifying like-minded individuals from the set of individuals based on the profile of the user, wherein the like-minded individuals are individuals with profile category configurations that are similar to the profile of the user;
processing the query with a tribal knowledge from the like-minded individuals to produce a collaborative search results list of links for the query, wherein the tribal knowledge comprises knowledge from the knowledge database for the like-minded individuals;
recording a session time spent by the user at each of the links provided in the collaborative search results list;

tracking sites visited by the user from each of the links provided in the collaborative search results list;

incorporating the values attained from recording the session time and tracking the sites visited into the knowledge database for the like-minded individuals; and presenting search results to the user in a two-pane window, which include search results from one or more organic search engines in one pane of the two-pane window, the collaborative search results list in the other pane of the two-pane window, and a set of categories associated with the user's profile, wherein selecting or de-selecting a category alters the categories used to process a search query.

9. The computer-readable storage medium of claim 8, wherein the method further comprises:

providing the user with a profile-creation page for creating a personal profile for the user;

providing one or more categories which define personal characteristics of the user in the profile-creation page; and receiving from the user a selection of one or more of the categories, wherein the selection allows the user to define personal characteristics of the user for the collaborative search procedure.

10. The computer-readable storage medium of claim 9, wherein selecting a category provides the user with zero or more sub-categories that can be selected to define detailed personal characteristics.

11. The computer-readable storage medium of claim 10, wherein the method further comprises:

receiving a parameter value from the user for a corresponding category; and associating the parameter value with the corresponding category.

12. The computer-readable storage medium of claim 11, wherein the method further comprises:

providing the a-user with a profile-modification page;

receiving profile modifications from the user through the profile-modification page; and committing the profile modifications to the corresponding personal profile of the user.

13. The computer-readable storage medium of claim 8, wherein the method further comprises:

sorting the collaborative search results list such that links most useful to like-minded individuals appear first;

wherein the usefulness of a link to the like-minded individuals is defined by the number of visits and total duration time the link has attained from the like-minded individuals.

14. The computer-readable storage medium of claim 8, wherein the method further comprises:

receiving a review from the user for a website;

associating the review with the user; and associating the review with the website.

15. An apparatus configured to facilitate intelligent query operations using a collaborative search procedure that employs tribal knowledge from a group of like-minded individuals, comprising:

a generating mechanism configured to generate a knowledge database based on a set of individuals, wherein the knowledge is based on one or more browsing sessions of the set of individuals; and the generating mechanism further configured to generate a profile comprising category configurations for a user, wherein the category configurations are entered by the user, and wherein the unique personal identifier identifying the user is associated with the profile of the user;

a receiving mechanism configured to receive a login request from a user, wherein the user is represented by a unique personal identifier;

wherein the receiving mechanism is further configured to receive a query from the user;

an identifying mechanism configured to identify like-minded individuals based on the profile of the user, wherein the like-minded individuals are individuals with profile category configurations that are similar to the profile of the user;

a query-processing mechanism configured to process the query with a tribal knowledge of the like-minded individuals to produce a collaborative search results list of links for the query from the user, wherein the tribal knowledge comprises knowledge from the knowledge database for the like-minded individuals;

recording a session time spent by the user at each of the links provided in the collaborative search results list;

tracking sites visited by the user from each of the links provided in the collaborative search results list;

incorporating the values attained from recording the session time and tracking the sites visited into the knowledge database for the like-minded individuals; and a presenting mechanism configured to present search results to the user in a two-pane window, which include search results from one or more existing organic search engines in one pane of the two-pane window, the collaborative search results list in the other pane of the two-pane window, and a set of categories associated with the profile of the user, wherein selecting or de-selecting a category alters the categories used to process a search query.

\* \* \* \* \*